United States Patent
Tamura et al.

(10) Patent No.: US 8,323,839 B2
(45) Date of Patent: Dec. 4, 2012

(54) NONAQUEOUS ELECTROLYTE SOLUTION FOR SECONDARY BATTERY AND NONAQUEOUS ELECTROLYTE SECONDARY BATTERY

(75) Inventors: Noriyuki Tamura, Kobe (JP); Toshikazu Yoshida, Tokushima (JP); Maruo Kamino, Tokushima (JP); Shin Fujitani, Hyogo (JP); Masahiro Takehara, Ibaraki (JP); Makoto Ue, Ibaraki (JP)

(73) Assignees: SANYO Electric Co., Ltd., Moriguchi-shi (JP); Mitsubishi Chemical Corporation, Tokyo (JP)

(*) Notice: Subject to any disclaimer, the term of this patent is extended or adjusted under 35 U.S.C. 154(b) by 2739 days.

(21) Appl. No.: 11/234,239

(22) Filed: Sep. 26, 2005

(65) Prior Publication Data

US 2006/0024587 A1 Feb. 2, 2006

Related U.S. Application Data

(63) Continuation of application No. PCT/JP2004/003625, filed on Mar. 18, 2004.

(30) Foreign Application Priority Data

Mar. 25, 2003 (JP) ................... 2003-083086

(51) Int. Cl.
*H01M 6/04* (2006.01)
(52) U.S. Cl. ........ 429/345; 429/340; 429/341; 429/344; 429/231.95
(58) Field of Classification Search .................. 429/340, 429/341, 345, 231.95
See application file for complete search history.

(56) References Cited

U.S. PATENT DOCUMENTS 5,352,548 A 10/1994 Fujimoto et al.
(Continued)

FOREIGN PATENT DOCUMENTS

JP 2-244565 9/1990
(Continued)

OTHER PUBLICATIONS

Robert A. Huggins, "Lithium alloy negative electrodes formed from convertible oxides", Solid State Ionics 113-115, 1998, pp. 57-67.

*Primary Examiner* — Patrick Ryan
*Assistant Examiner* — Ben Lewis
(74) *Attorney, Agent, or Firm* — Oblon, Spivak, McClelland, Maier & Neustadt, L.L.P.

(57) ABSTRACT

A nonaqueous electrolyte secondary battery in which the decomposition of an electrolyte solution is reduced exhibits high coulombic efficiency and excellent charge and discharge cycle performance, and has high energy density. This nonaqueous electrolyte secondary battery includes a negative electrode that is formed by depositing a thin film of active material on a collector by a CVD method, sputtering, evaporation, thermal spraying, or plating, wherein the thin film of the active material can lithiate and delithiate and is divided into columns by cracks formed in the thickness direction, and the bottom of each column is adhered to the collector; a positive electrode that can lithiate and delithiate; and a nonaqueous electrolyte solution containing a lithium salt in a nonaqueous solvent. The electrolyte solution contains a compound expressed by a general formula (I).

$$R_n\text{-}M\text{=}O \qquad (I)$$

(wherein, Rs are alkyl groups optionally having a substituent, may be identical or different from one another, may be independent substituents, or may be bound together to form a ring; M is S or P; and n is 2 when M is S and is 3 when M is P).

12 Claims, 1 Drawing Sheet

U.S. PATENT DOCUMENTS

| | | | |
|---|---|---|---|
| 6,210,830 B1 * | 4/2001 | Sartori et al. | 429/199 |
| 6,248,481 B1 * | 6/2001 | Visco et al. | 429/340 |
| 2002/0192564 A1 * | 12/2002 | Ota et al. | 429/324 |
| 2005/0100790 A1 | 5/2005 | Ota et al. | |

FOREIGN PATENT DOCUMENTS

| | | |
|---|---|---|
| JP | 3-152879 | 6/1991 |
| JP | 6-52887 | 2/1994 |
| JP | 8-321312 | 12/1996 |
| JP | 2002-279972 | 9/2002 |
| JP | 2003-17069 | 1/2003 |
| WO | WO 01/63686 | 8/2001 |
| WO | WO 02/058182 | 7/2002 |

* cited by examiner

NONAQUEOUS ELECTROLYTE SOLUTION FOR SECONDARY BATTERY AND NONAQUEOUS ELECTROLYTE SECONDARY BATTERY

CROSS REFERENCE TO RELATED APPLICATION

This is a continuation application of PCT/JP2004/003625 filed on Mar. 18, 2004.

FIELD OF THE INVENTION

The present invention relates to a nonaqueous electrolyte secondary battery and a nonaqueous electrolyte solution for use in the nonaqueous electrolyte secondary battery. In particular, the present invention relates to a nonaqueous electrolyte solution that is effective in improving the charge and discharge characteristics of a lithium secondary battery during charging/discharging cycles and to the lithium secondary battery utilizing the nonaqueous electrolyte solution, wherein the lithium secondary battery includes a negative electrode that is formed by depositing a thin film of active material on a collector by a CVD method, sputtering, evaporation, thermal spraying, or plating, and the thin film of the active material predominantly lithiates and delithiates.

BACKGROUND OF THE INVENTION

Owing to recent weight reduction and miniaturization of electrical appliances, a lithium secondary battery having a higher energy density is desired more than ever before. Furthermore, increased applications of the lithium secondary battery also require improvement in the battery performance.

At present, the positive electrode of the lithium secondary battery utilizes a metal oxide salt, such as lithium cobalt oxide, lithium nickel oxide, or lithium manganese oxide. The negative electrode of the lithium secondary battery utilizes a carbonaceous material, such as coke, artificial graphite, or natural graphite, alone or in combination.

In such a lithium secondary battery, it is known that a solvent in an electrolyte solution may decompose on the surface of the negative electrode, and thereby the storage characteristics or the cycle performance of the battery are deteriorated.

Ethylene carbonate, however, less decomposes on the surface of the negative electrode. In addition, a decomposition product of ethylene carbonate forms a relatively good protective film on the surface of the negative electrode. Thus, ethylene carbonate has been conventionally and widely used as the main solvent in an electrolyte solution of a nonaqueous electrolyte secondary battery. However, even when ethylene carbonate is used, the electrolyte solution slightly and continuously decomposes during charge and discharge. Thus, this may decrease the coulombic efficiency of the battery.

To solve these problems, it is known that a small amount of an agent for forming a protective film, for example, vinylene carbonate, is added to the electrolyte solution (for example, Japanese Unexamined Patent Application Publication No. 6-52887). The agent for forming the protective film decomposes to produce a decomposition product on a surface of a carbonaceous negative electrode during initial charge and discharge. The decomposition product thus produced forms a good protective film and thereby improves the storage characteristics or the cycle performance of the battery. For this reason, the agent for forming the protective film is often used in the lithium secondary battery.

On the other hand, in recent years, a next-generation nonaqueous electrolyte secondary battery has been proposed and gained attention. This battery includes a metal, such as tin or silicon, or oxide thereof which absorbs and discharges lithium ions, as a new negative electrode material which has much higher charge and discharge capacity per unit mass or unit volume than the carbonaceous negative electrode (Solid State Ionics. 113-115.57(1998)).

Particularly, the nonaqueous electrolyte secondary battery having an electrode formed by depositing a thin film of the active material that absorbs or discharges lithium, such as a silicon thin film or a tin thin film, on a collector by a CVD method, sputtering, evaporation, thermal spraying, or plating exhibits high charge and discharge capacity and excellent charge and discharge cycle performance. In such an electrode, the thin film of the active material is divided into columns by cracks formed in the thickness direction. The bottom of each column adheres to the collector. A gap around the column relaxes stress generated by the expansion and contraction of the thin film during charging/discharging cycles. This relaxation reduces the stress, which may cause the detachment of the thin film of the active material from the collector. Thus, the battery exhibits excellent charge and discharge cycle performance (Japanese Unexamined Patent Application Publication No. 2002-279972).

However, the negative electrode material made of a metal, such as silicon or tin, or of an alloy or an oxide containing the metal element is, in general, more reactive with various electrolytes, organic solvents, and additives in the electrolyte solution than the conventional carbonaceous negative electrode. Thus, an electrolyte additive has been desired from which a protective film adaptable to these new negative electrode materials is formed.

SUMMARY OF THE INVENTION

The present invention provides a nonaqueous electrolyte solution for a secondary battery and the secondary battery utilizing the nonaqueous electrolyte solution, wherein the decomposition of the electrolyte solution is minimized, and thereby the nonaqueous electrolyte secondary battery exhibits high charge and discharge efficiency and excellent charge and discharge cycle performance, and has high energy density.

The nonaqueous electrolyte solution for a secondary battery according to a first aspect of the present invention is used in a nonaqueous electrolyte secondary battery. The battery has a negative electrode having a collector and a thin film of active material deposited on the collector by a CVD method, sputtering, evaporation, thermal spraying, or plating. The thin film of the active material absorbs and discharges lithium. The thin film is divided into columns by cracks formed in the thickness direction, and the bottom of each column is adhered to the collector. The battery further has a positive electrode which is capable of lithiates and delithiates; and a nonaqueous electrolyte solution comprising nonaqueous solvent and a lithium salt dissolved therein. The nonaqueous electrolyte solution contains a compound expressed by a general formula (I):

$$R_n\text{-}M\text{=}O \ldots \quad (I)$$

(wherein, R is an alkyl group optionally having a substituent; each R may be identical or different from one another, may be independent substituents, or may be bound to each other to form a ring; M is S(sulfur) or P(phosphorus); and n is 2 when M is S and is 3 when M is P).

The nonaqueous electrolyte secondary battery according to a second aspect of the present invention has a negative electrode having a collector and a thin film of the active material deposited on the collector by a CVD method, sputtering, evaporation, thermal spraying, or plating. The thin film of the active material absorbs and discharges lithium. The thin film is divided into columns by cracks formed in the thickness direction, and the bottom of each column is adhered to the collector. The battery further has a positive electrode which is capable of lithiates and delithiates; and an electrolyte solution comprising a nonaqueous solvent and a lithium salt dissolved therein. The electrolyte solution is the nonaqueous electrolyte solution according to the first aspect of the present invention.

The nonaqueous electrolyte solution containing the compound expressed by the general formula (I) produces effectively a stable and excellent protective film highly permeable to lithium ions on the front and side faces of each column of the thin film of the active material on the negative electrode from the initial charging. This protective film reduces excessive decomposition of the electrolyte solution, stabilizes the columnar structure of the thin film of the active material, and prevents the deterioration or the pulverization of the columns. This improves the charge and discharge cycle performance of the lithium secondary battery.

In one aspect of the present invention, all of the n Rs in the general formula (I) are independently chain alkyl groups each having 1 to 4 carbon atoms and each optionally having a substituent.

In another aspect of the present invention, M in the general formula (I) is S, and two Rs in the general formula (I) are bound to each other to form an alkylene group having 4 to 6 carbon atoms and optionally having a substituent, the alkylene group constituting part of a ring.

In yet another aspect of the present invention, M in the general formula (I) is P, two of three Rs in the general formula (I) are bound together to form an alkylene group having 4 to 6 carbon atoms and optionally having a substituent, the alkylene group constituting part of a ring, and the remaining R is a chain alkyl group having 1 to 4 carbon atoms and optionally having a substituent.

DETAILED DESCRIPTION OF THE INVENTION

Figure 1:
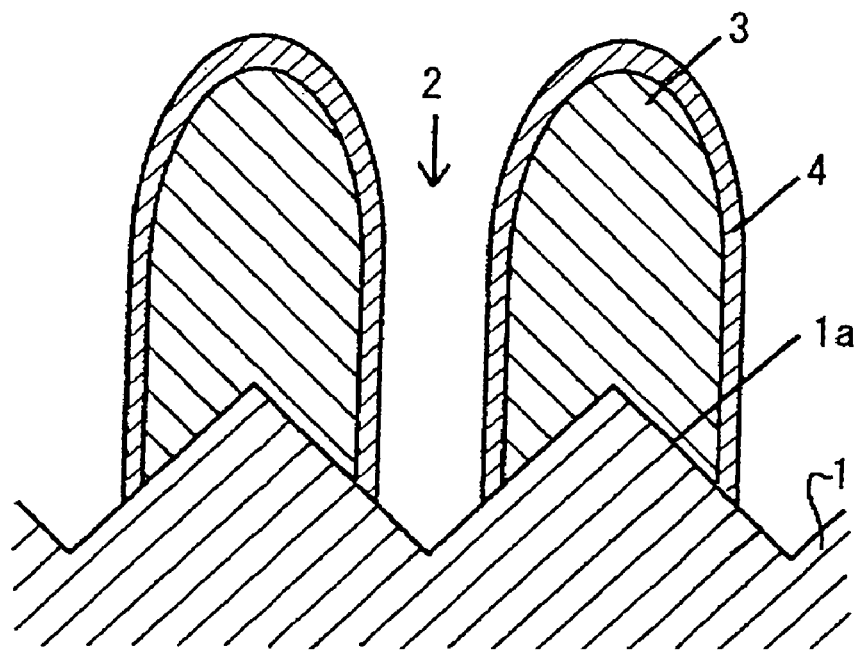
FIG. 1 is a schematic view of a surface of a negative electrode according to the present invention.

Embodiments of the present invention will be described in detail below.

First, a nonaqueous electrolyte solution for a secondary battery according to the present invention will be described.

The nonaqueous electrolyte solution according to the present invention contains the compound expressed by the general formula (I):

$$R_n\text{-M=O} \ldots \quad (\text{I})$$

wherein, R is an alkyl group optionally having a substituent, and n Rs may be identical or different from one another, may be independent substituents, or may be bound together to form a ring.

M is S or P, and n is 2 when M is S; that is, the general formula represents a sulfoxide compound containing two Rs. Thus, when the two Rs are independent of each other, they are two alkyl groups that may be identical or different from each other and optionally have a substituent. When the two Rs are bound to form a ring, they are bound to form a ring containing M.

When M is P, n is 3; that is, the general formula represents a phosphine oxide compound containing three Rs. Thus, when the three Rs are independent of one another, they are three alkyl groups that may be identical or different from one another and optionally have a substituent. When the three Rs are bound to form a ring, two Rs of them are bound to form a ring containing M, and one R remains independently.

The independent alkyl group R optionally having a substituent may be a chain alkyl group or a cyclic alkyl group.

The chain alkyl group may have one to four carbon atoms and in particular may be methyl, ethyl, n-propyl, i-propyl, n-butyl, i-butyl, or t-butyl. The cyclic alkyl group may have three to eight carbon atoms and in particular may be cyclopropyl or cyclohexyl. The independent alkyl group R optionally having a substituent may be a chain alkyl group having one to four carbon atoms, such as methyl, ethyl, n-propyl, i-propyl, n-butyl, i-butyl, or t-butyl, optionally having a substituent. When the alkyl group has too many carbon atoms, the compound expressed by the general formula (I) may have lower oxidation resistance or lower solubility in the electrolyte solution.

The optional substituent in the independent alkyl group R may be an alkyl group; a halogen atom, such as a chlorine atom, a bromine atom, or an iodine atom; an alkoxy group; a carbonate group; a carboxylate group; or an amino group.

The total molecular weight of the independent alkyl group R and its optional substituent is typically 200 or less. When this molecular weight is too high, the compound expressed by the general formula (I) may have lower solubility in a nonaqueous solvent described below, and the viscosity of the electrolyte solution may increase.

Preferably, the independent alkyl group R optionally having a substituent is an alkyl group having no substituent or is a fluoroalkyl group in which at least part (preferably about one to three in the substituent) of hydrogen atoms bound to carbon atoms are substituted by a fluorine atom or fluorine atoms, which has high oxidation-reduction resistance, excellent solubility, and high storage stability.

Specifically, the independent alkyl group R optionally having a substituent may be methyl, fluoromethyl, difluoromethyl, trifluoromethyl, ethyl, α-fluoroethyl, β-fluoroethyl, β,β,β-trifluoroethyl, n-propyl, α-fluoro-n-propyl, β-fluoro-n-propyl, γ-fluoro-n-propyl, γ,γ,γ-trifluoro-n-propyl, i-propyl, α-fluoro-i-propyl, bis(trifluoromethyl)methyl, n-butyl, δ,δ,δ-trifluoro-n-butyl, t-butyl, fluoro-t-butyl, or tris(trifluoromethyl)methyl.

The compound expressed by the general formula (I) has excellent solubility and high stability when the independent alkyl group R optionally having a substituent is a methyl group, an ethyl group, a methyl group substituted by at least one fluorine atom, an ethyl group substituted by at least one fluorine atom, a n-propyl group, or a n-butyl group. The compound expressed by the general formula (I) can be easily synthesized when the independent alkyl group R optionally having a substituent is a methyl group, an ethyl group, a fluoromethyl group, a β-fluoroethyl group, a β,β,β-trifluoroethyl group, a n-propyl group, an i-propyl group, a n-butyl group, an i-butyl group, or a t-butyl group. Most preferably, the independent alkyl group R optionally having a substituent is a methyl group, an ethyl group, a n-propyl group, or a n-butyl group.

The compound expressed by the general formula (I) composed only of independent Rs may be any compound obtained from the combination of these specific examples of R.

When M is S, the compound expressed by the general formula (I) composed only of independent Rs is preferably dimethyl sulfoxide, fluoromethyl methyl sulfoxide, bis(fluoromethyl) sulfoxide, methyl trifluoromethyl sulfoxide, bis(trifluoromethyl) sulfoxide, diethyl sulfoxide, bis(β-fluoroethyl) sulfoxide, bis(β,β,β-trifluoroethyl) sulfoxide, di-n-propyl sulfoxide, di-i-propyl sulfoxide, di-n-butyl sulfoxide, di-i-butyl sulfoxide, or di-t-butyl sulfoxide, and is more preferably dimethyl sulfoxide, diethyl sulfoxide, di-n-propyl sulfoxide, or di-n-butyl sulfoxide.

When M is P, the compound expressed by the general formula (I) composed only of independent Rs is preferably trimethylphosphine oxide, fluoromethyl dimethyl phosphine oxide, tris(trifluoromethyl)phosphine oxide, methyl trifluoromethyl phosphine oxide, tris(trifluoromethyl)phosphine oxide, triethylphosphine oxide, tris(β-fluoroethyl)phosphine oxide, tris(β,β,β-trifluoroethyl)phosphine oxide, tri-n-propylphosphine oxide, tri-i-propylphosphine oxide, tri-n-butylphosphine oxide, tri-i-butylphosphine oxide, or tri-t-butylphosphine oxide, and is more preferably trimethylphosphine oxide, triethylphosphine oxide, tri-n-propylphosphine oxide, or tri-n-butylphosphine oxide.

The alkylene group that contains two Rs bound together to form a ring may be a alkylene group that has 4 to 8 carbon atoms and forms a ring containing M. Specifically, in the alkylene group that contains two Rs bound together to form a ring, when M is S, the compound expressed by the general formula (I) may have a tetramethylene sulfoxide skeleton, a pentamethylene sulfoxide skeleton, a hexamethylene methylene sulfoxide skeleton, a heptamethylene sulfoxide skeleton, or an octamethylene sulfoxide skeleton, and may more preferably have a tetramethylene sulfoxide skeleton, or a pentamethylene sulfoxide skeleton.

When M is P, the compound expressed by the general formula (I) may preferably have a 1-alkylphosphorane-1-oxide skeleton, a 1-alkylphosphorinane-1-oxide skeleton, a 1-alkylphosphepane-1-oxide skeleton, or a 1-alkylphosphocane-1-oxide skeleton, and may more preferably have a 1-alkylphosphorane-1-oxide skeleton or a 1-alkylphosphorinane-1-oxide skeleton.

The optional substituent in the alkylene group that contains two Rs bound together to form a ring may be an alkyl group; a halogen atom, such as a chlorine atom, a bromine atom, or an iodine atom; an alkoxy group; a carbonate group; a carboxylate group; or an amino group.

As in the independent alkyl group R, when the alkylene group that contains two Rs bound together to form a ring has too many carbon atoms, the compound expressed by the general formula (I) may have lower oxidation resistance or lower solubility in the electrolyte solution.

The total molecular weight of the alkylene group that contains two Rs bound together to form a ring and their optional substituents is typically 200 or less and preferably 100 or less. When this molecular weight is too high, the compound expressed by the general formula (I) may have lower solubility, and the viscosity of the electrolyte solution may increase.

When the alkylene group that contains two Rs bound together to form a ring is an alkylene group having no substituent, or a fluoroalkylene group in which at least part of hydrogen atoms bound to carbon atoms are substituted by a fluorine atom or fluorine atoms, the compound expressed by the general formula (I) has high oxidation-reduction resistance, excellent solubility, and high storage stability.

When M is S, a compound having the alkylene group that contains two Rs bound together to form a ring is preferably tetramethylene sulfoxide, 2-fluorotetramethylene sulfoxide, 3-fluorotetramethylene sulfoxide, octafluorotetramethylene sulfoxide, pentamethylene sulfoxide, 2-fluoropentamethylene sulfoxide, 3-fluoropentamethylene sulfoxide, 4-fluoropentamethylene sulfoxide, decafluoropentamethylene sulfoxide, hexamethylene sulfoxide, 2-fluorohexamethylene sulfoxide, 3-fluorohexamethylene sulfoxide, 4-fluorohexamethylene sulfoxide, dodecafluorohexamethylene sulfoxide, heptamethylene sulfoxide, 2-fluoroheptamethylene sulfoxide, 3-fluoroheptamethylene sulfoxide, 4-fluoroheptamethylene sulfoxide, 5-fluoroheptamethylene sulfoxide, tetradecafluoroheptamethylene sulfoxide, octamethylene sulfoxide, 2-fluorooctamethylene sulfoxide, 3-fluorooctamethylene sulfoxide, 4-fluorooctamethylene sulfoxide, 5-fluorooctamethylene sulfoxide, or hexadecafluorooctamethylene sulfoxide, and is more preferably tetramethylene sulfoxide or pentamethylene sulfoxide.

When M is P, a compound having the alkylene group that contains two Rs bound together to form a ring is preferably 1-alkylphosphorane-1-oxide, 1-alkyl-2-fluorophosphorane-1-oxide, 1-alkyl-3-fluorophosphorane-1-oxide, 1-alkyl octafluorophosphorane-1-oxide, 1-alkylphosphorinane-1-oxide, 1-alkyl-2-fluorophosphorinane-1-oxide, 1-alkyl-3-fluorophosphorinane-1-oxide, 1-alkyl-4-fluorophosphorinane-1-oxide, 1-alkyl decafluorophosphorinane-1-oxide, 1-alkylphosphepane-1-oxide, 1-alkyl-2-fluorophosphepane-1-oxide, 1-alkyl-3-fluorophosphepane-1-oxide, 1-alkyl-4-fluorophosphepane-1-oxide, 1-alkyl dodecafluorophosphepane-1-oxide, 1-alkylphosphocane-1-oxide, 1-alkyl-2-fluorophosphocane-1-oxide, 1-alkyl-3-fluorophosphocane-1-oxide, 1-alkyl-4-fluorophosphocane-1-oxide, 1-alkyl-5-fluorophosphocane-1-oxide, or 1-alkyl tetradecafluorophosphocane-1-oxide. More preferably, when M is P, in the compound having the alkylene group that contains two Rs bound together to form a ring, an independent alkyl group is a methyl group, a fluoromethyl group, a β-fluoroethyl group, a β,β,β-trifluoroethyl group, a n-propyl group, or a n-butyl group. Still more preferably, when M is P, the compound having the alkylene group that contains two Rs bound together to form a ring is 1-methylphosphorane-1-oxide, 1-ethylphosphorane-1-oxide, 1-n-propylphosphorane-1-oxide, 1-n-butylphosphorane-1-oxide, 1-methylphosphorinane-1-oxide, 1-ethylphosphorinane-1-oxide, 1-n-propylphosphorinane-1-oxide, or 1-n-butylphosphorinane-1-oxide.

As described above, these compounds expressed by the general formula (I) allow the efficient formation of a stable and excellent protective film highly permeable to lithium ions on the front and side faces of each column of the thin film of the active material in the negative electrode from the initial charging. This protective film reduces excessive decomposition of the electrolyte solution, stabilizing the columnar structure of the thin film of the active material and preventing the deterioration or the disintegration of the column. Thus, the charge and discharge cycle performance of the lithium secondary battery should be improved.

When the amount of the compound expressed by the general formula (I) in the electrolyte solution is too small, such a protective film cannot be formed completely. Thus, the effects of the protective film may not be fully obtained at the initial charging. On the other hand, when the amount of the compound expressed by the general formula (I) in the electrolyte solution is too large, part of the compound molecules that are not involved in the formation of the protective film during the initial charging may adversely affect the battery performance.

Thus, the compound expressed by the general formula (I) is preferably used in such an amount that most of the compound molecules are consumed in forming the protective film at the initial charging where the compound has greatest effects.

Specifically, the compound expressed by the general formula (I) is contained in the electrolyte solution typically at 0.01% by weight or more, preferably at 0.1% by weight or more, and more preferably at 0.5% by weight or more, and typically at 10% by weight or less, preferably at 5% by weight or less, and more preferably at 3% by weight or less, based on the electrolyte solution.

Examples of the nonaqueous solvent for use in the electrolyte solution according to the present invention include a cyclic carbonate, a chain carbonate, a lactone compound (cyclic carboxylate ester), a chain carboxylate ester, a cyclic ether, a chain ether, and a sulfur-containing organic solvent. These solvents are used alone or in combination.

Among these, the electrolyte solution preferably contains a cyclic carbonate, a lactone compound, a chain carbonate, a chain carboxylate ester, or a chain ether, each having 3 to 9 total carbon atoms. More preferably, the electrolyte solution contains a cyclic carbonate and/or a chain carbonate each having 3 to 9 total carbon atoms.

Specifically, the cyclic carbonate, the lactone compound, the chain carbonate, the chain carboxylate ester, and the chain ether each having 3 to 9 total carbon atoms may be the compounds described in i) to v) below.

i) Cyclic carbonate having 3 to 9 total carbon atoms: ethylene carbonate, propylene carbonate, butylene carbonate, vinylene carbonate, and vinylethylene carbonate. Ethylene carbonate and propylene carbonate are more preferred.

ii) Lactone compound having 3 to 9 total carbon atoms: γ-butyrolactone, γ-valerolactone, and δ-valerolactone. γ-butyrolactone is more preferred.

iii) Chain carbonate having 3 to 9 total carbon atoms: dimethyl carbonate, diethyl carbonate, di-n-propyl carbonate, diisopropyl carbonate, n-propyl isopropyl carbonate, di-n-butyl carbonate, di-i-propyl carbonate, di-t-butyl carbonate, n-butyl-i-butyl carbonate, n-butyl-t-butyl carbonate, i-butyl-t-butyl carbonate, ethyl methyl carbonate, methyl-n-propyl carbonate, n-butyl methyl carbonate, i-butyl methyl carbonate, t-butyl methyl carbonate, ethyl-n-propyl carbonate, n-butyl ethyl carbonate, i-butyl ethyl carbonate, t-butyl ethyl carbonate, n-butyl-n-propyl carbonate, i-butyl-n-propyl carbonate, t-butyl-n-propyl carbonate, n-butyl-i-propyl carbonate, i-butyl-i-propyl carbonate, and t-butyl-i-propyl carbonate. Among these, dimethyl carbonate, diethyl carbonate, and ethyl methyl carbonate are more preferred.

iv) Chain carboxylate ester having 3 to 9 total carbon atoms: methyl acetate, ethyl acetate, n-propyl acetate, i-propyl acetate, n-butyl acetate, i-butyl acetate, t-butyl acetate, methyl propionate, ethyl propionate, n-propyl propionate, i-propyl propionate, n-butyl propionate, i-butyl propionate, and t-butyl propionate. Among these, ethyl acetate, methyl propionate, and ethyl propionate are more preferred.

v) Chain ether having 3 to 9 total carbon atoms and preferably having 3 to 6 total carbon atoms: dimethoxymethane, dimethoxyethane, diethoxymethane, diethoxyethane, ethoxy methoxymethane, and ethoxy methoxyethane. Among these, dimethoxyethane and diethoxyethane are more preferred.

In the present invention, at least 70% by volume of the nonaqueous solvent is preferably at least one solvent selected from the group consisting of the lactone compound, the cyclic carbonate, the chain carbonate, the chain ether, and the chain carboxylate ester each having 3 to 9 total carbon atoms, and at least 20% by volume of the nonaqueous solvent is preferably the lactone compound having 3 to 9 total carbon atoms and/or the cyclic carbonate having 3 to 9 total carbon atoms.

A lithium salt solute in the electrolyte solution according to the present invention may be any salt, provided that it can be used as a solute. The lithium salt may be an inorganic salt or an organic salt.

The inorganic lithium salt may be an inorganic fluoride, such as $LiPF_6$, $LiAsF_6$, $LiBF_4$, or $LiAlF_4$; or a perhalogen acid salt, such as $LiClO_4$, $LiBrO_4$, or $LiIO_4$.

The organo lithium salt may be a fluorine-containing organo lithium salt, including an organic sulfonate, such as $LiCF_3SO_3$; a perfluoroalkyl sulfonic acid imide salt, such as $LiN(CF_3SO_2)_2$, $LiN(C_2F_5SO_2)_2$, or $LiN(CF_3SO_2)(C_4F_9SO_2)$; a perfluoroalkyl sulfonic acid methide salt, such as $LiC(CF_3SO_2)_3$; or an inorganic fluoride in which part of fluorine atoms are substituted by a perfluoroalkyl group or perfluoroalkyl groups, such as $LiPF_3(CF_3)_3$, $LiPF_2(C_2F_5)_4$, $LiPF_3(C_2F_5)_3$, $LiB(CF_3)_4$, $LiBF(CF_3)_3$, $LiBF_2(CF_3)_2$, $LiBF_3(CF_3)$, $LiB(C_2F_5)_4$, $LiBF(C_2F_5)_3$, $LiBF_2(C_2F_5)_2$, or $LiBF_3(C_2F_5)$.

Preferably, the lithium salt is $LiPF_6$, $LiBF_4$, $LiN(CF_3SO_2)_2$, $LiN(C_2F_5SO_2)_2$, $LiN(CF_3SO_2)(C_4F_9SO_2)$, $LiPF_3(CF_3)_3$, $LiPF_3(C_2F_5)_3$, or $LiBF_2(C_2F_5)_2$.

These lithium salts may be used alone or in combination.

It is desirable that $LiBF_4$ and/or $LiPF_6$ be contained as a lithium salt or lithium salts typically in the amount of at least 5% by mole, and preferably in the amount of at least 30% by mole, and typically in the amount of 100% by mole or less, based on the total lithium salts in the electrolyte solution. Use of $LiBF_4$ and/or $LiPF_6$ as a lithium salt or lithium salts provides an excellent electrolyte solution that has high electrochemical stability and high electric conductivity over a wide temperature range. When the contents of $LiBF_4$ and/or $LiPF_6$ are too small, these characteristics may not be achieved sufficiently.

It is desirable that the concentration of the lithium salt solute in the electrolyte solution be in the range of 0.5 mol/l to 3 mol/l. When the concentration of the lithium salt in the electrolyte solution is too low, the absolutely insufficient concentration results in inadequate electric conductivity of the electrolyte solution. On the other hand, when the lithium salt concentration is too high, the electric conductivity decreases because of increase in the viscosity of the electrolyte solution, and the lithium salt tends to precipitate at low temperature. Thus, the battery performance tends to be deteriorated.

In addition to the nonaqueous solvent, the compound expressed by the general formula (I), and the lithium salt, the nonaqueous electrolyte solution according to the present invention may further contain an overcharge protecting agent, a dehydrating agent, and/or a deoxidizer, all of which are known in the art.

Second, a nonaqueous electrolyte secondary battery according to the present invention that utilizes the electrolyte solution according to the present invention will be described below.

The negative electrode in the nonaqueous electrolyte secondary battery according to the present invention will be described below with reference to FIG. 1. FIG. 1 is a schematic view of a surface of the negative electrode according to the present invention.

The negative electrode has a collector 1 and a thin film of the active material on the collector 1. The thin film of the active material lithiates and delithiates. The thin film is deposited on the collector 1 by a CVD method, sputtering, evaporation, thermal spraying, or plating. The thin film of the active material is divided into columns 3 by cracks (void) 2 formed in the thickness direction of the thin film. The bottom of each column 3 is adhered to a surface 1a of the collector 1. In general, the crack 2 is formed along a low-density region of the thin film of the active material extending in the thickness direction by the first or later charging and discharging. Upon the negative electrode comes into contact with the electrolyte solution, a protective film 4 is formed on the surface of the column 3.

The active material constituting the thin film is preferably has a high theoretical volume capacity. Examples of the active material include silicon, germanium, tin, lead, zinc, magnesium, sodium, aluminum, potassium, and indium. Among these, silicon, germanium, tin, and aluminum are preferred. Silicon and tin are more preferred. The thin film of the active material may be composed of an amorphous silicon thin film, a microcrystal silicon thin film, or tin and an alloy of tin and the collector metal.

To stabilize the structure of the column 3 and to improve the adherence between the column 3 and the collector 1, it is preferable that a component in the collector 1 diffuses into the thin film of the active material constituting the column 3 and that the formed phase structure is stable.

When the thin film of the active material is made of silicon, the component of the collector diffusing in the thin film of the active material preferably does not form an intermetallic compound but forms a solid solution with silicon. Thus, the thin film of the active material in this case is preferably an amorphous silicon thin film or a microcrystal silicon thin film.

When the thin film of the active material is made of tin, a mixed phase of the component of the collector and tin is preferably formed between the collector and a thin film composed of the active material. This mixed phase may be made of an intermetallic compound or a solid solution of tin and the collector component. The mixed phase can be formed by heat treatment. The conditions of the heat treatment depend on the active material component, the thickness of the thin film of the active material, and the collector. When a tin film having a thickness of 1 µm is formed on the collector made of copper, the tin film and the collector are preferably heat-treated at a temperature between 100° C. and 240° C. in a vacuum.

The thickness of the thin film of the active material is not limited to a specific value, but is preferably at least 1 µm to achieve high charge and discharge capacity. Preferably, the thickness is not greater than 20 µm.

The collector may be made of any metallic material under the condition that the thin film of the active material can be formed on the collector with high adhesion and that the material can not be alloyed with lithium. The collector is preferably made of at least one material selected from the group consisting of copper, nickel, stainless steel, molybdenum, tungsten, and tantalum, and is more preferably made of easily available copper or nickel, and is still more preferably made of copper.

When the negative electrode collector is too thick, it undesirably occupies a greater space in the battery structure. Thus, the thickness of the negative electrode collector is preferably not greater than 30 µm, and more preferably not greater than 20 µm. Because the negative electrode collector that is too thin has insufficient mechanical strength, it preferably has a thickness of at least 1 µm and more preferably has a thickness of at least 5 µm.

Preferably, the collector 1 is made of a rough-surfaced foil, such as a rough-surfaced copper foil, to form bumps and dips that correspond to bumps and dips on the collector surface 1a, on the surface of the thin film of the active material. This foil may be electrolytic foil. The electrolytic foil is prepared, for example, by dipping a metallic drum into an electrolyte solution containing a metal ion applying an electric current while rotating the metallic drum to deposit the metal on the metallic drum, and removing the resulting metal from the metallic drum. One side or both sides of the electrolytic foil may be roughened or surface-treated. Alternatively, the roughed surface may also be prepared by electrodepositing metal on one side or both sides of rolled foil. The surface roughness Ra of the collector is preferably at least 0.01 µm and more preferably at least 0.1 µm. Preferably, the surface roughness Ra of the collector is not greater than 1 µm. The surface roughness Ra is defined by Japanese Industrial Standards (JIS B 0601-1994) and can be measured, for example, with a surface roughness tester.

The thin film of the active material may also be formed on the collector using a material which has already lithiated. Alternatively, lithium may be added to the thin film of the active material when the thin film of the active material is formed on the collector. Alternatively, after the formation of the thin film of the active material, lithium may be added to the thin film of the active material.

Preferably, the positive electrode in the battery according to the present invention may be composed of a material which can lithiate and delithiate, such as lithium transition metal oxide, including lithium cobalt oxide, lithium nickel oxide, lithium manganese oxide, and complex oxide thereof. These materials for the positive electrode may be used alone or in combination.

The positive electrode may be manufactured by a various method. For example, the positive electrode may be manufactured by adding a binder, a thickening agent, a conductive material, and/or a solvent to the positive electrode material as necessary to prepare a slurry, applying the slurry to a collector of the positive electrode, and drying it. Furthermore, the positive electrode material may be directly subjected to roll forming to form a sheet electrode, may be pressed into a pellet electrode, or may be formed into a thin film on the collector by a CVD method, sputtering, evaporation, or thermal spraying.

When a binder is used in manufacturing the positive electrode, the binder may be any material that is resistant to a solvent used in the manufacture of the electrode, the electrolyte solution, or other materials for use in the battery. Specific examples of the binder include polyvinylidene fluoride, polytetrafluoroethylene, a styrene-butadiene rubber, an isoprene rubber, and a butadiene rubber.

When a thickening agent is used in manufacturing the positive electrode, the agent may be any material which is resistant to a solvent used in the manufacture of the electrode, the electrolyte solution, or other materials for use in the battery. Specific examples of the thickening agent include carboxymethylcellulose, methylcellulose, hydroxymethylcellulose, ethylcellulose, polyvinyl alcohol, oxidized starch, phosphorylated starch, and casein.

When a conductive material is used in manufacturing the positive electrode, the conductive material may be any material that is resistant to a solvent used in the manufacture of the electrode, the electrolyte solution, or other materials for use in the battery. Specific examples of the conductive material include a metallic material, such as copper or nickel, and a carbon material, such as graphite or carbon black.

A material for the collector of the positive electrode may be a metal, such as aluminum, titanium, or tantalum. Among these, aluminum foil is preferred because it is easily processed into a thin film and is inexpensive. The thickness of the positive electrode collector is not limited to a specific value, but is preferably not greater than 50 µm and is more preferably not greater than 30 µm because of the same reason as in the negative electrode collector. The thickness of the positive electrode collector is preferably at least 1 μm and more preferably at least 5 μm.

A separator used in the battery according to the present invention may be made of various material and may have various shape. Preferably, the material is selected from those that are resistant to the electrolyte solution and have large solution-holding capacities. Thus, the separator is preferably a porous sheet or a nonwoven fabric made of polyolefin, such as polyethylene or polypropylene.

A method for manufacturing the battery according to the present invention, which includes at least the negative electrode, the positive electrode, and the nonaqueous electrolyte solution is not limited to any specific method, and may be appropriately selected from widely-used methods.

Furthermore, the battery has any shape and may be of a cylinder type containing sheet electrodes and the separator(s) in a spiral shape, a cylinder type that has an inside-out structure of pellet electrodes and the separator(s), or a coin type in which pellet electrodes and the separator(s) are stacked.

In the present invention, the use of the nonaqueous electrolyte solution containing the compound expressed by the general formula (I) allows the efficient formation of a stable and excellent protective film highly permeable to lithium ions on the front and side faces of each column 3 of the thin film of the active material in the negative electrode from the initial charging. This protective film 4 prevents the decomposition of the electrolyte solution on the active material in the negative electrode. Thus, the columnar structure 3 of the thin film of the active material on the collector 1 is stabilized, and the deterioration or the pulverization of the column is prevented. In this way, a nonaqueous electrolyte secondary battery that exhibits high charge and discharge efficiency and excellent charge and discharge cycle performance is provided.

EXAMPLES AND COMPARATIVE EXAMPLES

While the present invention will be further described with reference to Examples and Comparative Examples, the present invention should not be limited to these Examples and is effective within the scope of the present invention.

In these Examples and Comparative Examples, methods for manufacturing and evaluating the nonaqueous electrolyte secondary battery are as follows.

[Manufacture of Silicon Thin Film Negative Electrode]

Electrolysis copper foil (thickness 18 μm, surface roughness Ra=0.188 μm) was subjected to RF sputtering under the following conditions to form a silicon thin film having a thickness of about 5 μm: the flow rate of sputtering gas (Ar)= 100 sccm, the substrate temperature=room temperature (without heating), the reaction pressure=0.133 Pa ($1.0 \times 10^{-3}$ Torr), and high frequency electric power=200 W. By the Raman spectroscopic analysis of the silicon thin film thus produced, a peak was detected around the wavelength of 480 $cm^{-1}$ while no peak was detected around the wavelength of 520 $cm^{-1}$. Thus, the silicon thin film was identified as an amorphous silicon thin film. The electrolysis copper foil having the amorphous silicon thin film was dried at 100° C. for 2 hours in a vacuum and was punched into a disk having a diameter of 10.0 mm, which serves as the negative electrode.

[Manufacture of Tin Thin Film Negative Electrode]

Electrolysis copper foil (thickness 18 μm, surface roughness Ra=0.29 μm) was subjected to electrodeposition using tin as an anode in an electrolytic bath containing 40 g·$dm^{-3}$ of tin sulfate, 150 g·$dm^{-3}$ of 98% sulfuric acid, 5 $cm^3$·$dm^{-3}$ of formalin, and 40 $cm^3$·$dm^{-3}$ of tin plating additive (C. Uyemura & Co., Ltd.). A tin thin film having a thickness of 1 μm was formed on the electrolysis copper foil. This electrode was heat-treated at 140° C. for 6 hours, was dried at 100° C. for 2 hours in a vacuum, and was punched into a disk having a diameter of 10.0 mm, which serves as the negative electrode.

[Manufacture of Positive Electrode]

Six percent by weight of carbon black (Denki Kagaku Kogyo K.K., trade name: DENKA BLACK) and 9% by weight of polyvinylidene fluoride KF-1000 (Kureha Chemical Industry Co., Ltd., trade name: KF-1000) were mixed with 85% by weight of positive electrode active material $LiCoO_2$ (Nippon Chemical Industrial Co., Ltd., C5). The mixture was dispersed in N-methyl-2-pyrrolidone to produce a slurry. This slurry was uniformly applied to aluminum foil having a thickness of 20 μm, which serves as the positive electrode collector, in an amount that corresponds to about 90% of the theoretical capacity of the negative electrode, was dried at 100° C. for 12 hours, and was punched into a disk having a diameter of 10.0 mm, which serves as the positive electrode.

[Manufacture of Coin-Type Cell]

The positive electrode, the negative electrodes, and the electrolyte solutions prepared in the Examples and the Comparative Example were used in the following manner. The positive electrode was placed in a stainless steel case, which also serves as an electric conductor of the positive electrode. Then, a polyethylene separator impregnated with the electrolyte solution was placed on the positive electrode. Then, the negative electrode was placed on the separator. This case, an intermediate insulating gasket, and a sealing plate, which also serves as an electric conductor of the negative electrode, were caulked to produce a coin-type cell.

Figure 2:
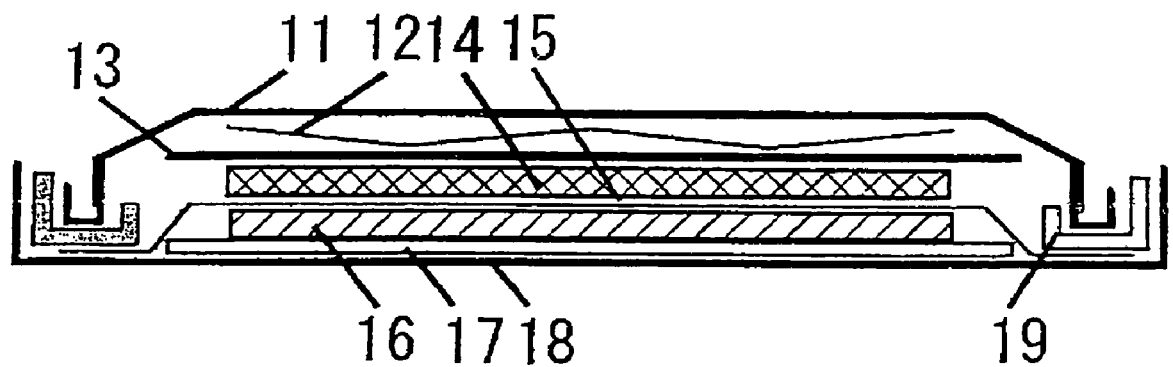
FIG. 2 is a cross-sectional view showing the structure of a coin-type cell according to an example of the present invention.

FIG. 2 is a cross-sectional view showing the structure of the coin-type cell thus produced. Reference numeral 11 denotes a negative electrode case, reference numeral 12 denotes a spring washer, reference numeral 13 denotes a spacer, reference numeral 14 denotes a negative electrode, reference numeral 15 denotes a separator, reference numeral 16 denotes a positive electrode, reference numeral 17 denotes a spacer, reference numeral 18 denotes a positive electrode case, and reference numeral 19 denotes a gasket.

[Evaluation of Coin-Type Cell Including Silicon Thin Film Negative Electrode]

The cell was charged under constant current of 3 mA until reaching 4.2V in cell voltage followed by constant voltage of 4.2V until reaching 0.15 mA, and then was discharged under constant current of 3 mA until reaching 3.0V in cell voltage. This charge-discharge cycle was performed 30 times at 25° C. The capacity retention ratio was expressed by dividing the capacity at the 30th cycle by the capacity at the third cycle.

[Evaluation of Coin-Type Cell Including Tin Thin Film Negative Electrode]

The cell was charged under constant current of 0.6 mA until reaching 4.2V in cell voltage followed by constant voltage of 4.2V until reaching 0.03 mA, and then was discharged under constant current of 0.6 mA until reaching 3.0V in cell voltage. This charge-discharge cycle was performed 30 times at 25° C. The capacity retention ratio was expressed by dividing the capacity at the 30th cycle by the capacity at the third cycle.

Examples 1-10, Comparative Examples 1 and 2

Electrolyte solutions were prepared in the following manner. One mol/l of lithium hexafluorophosphate ($LiPF_6$) solute, which was sufficiently dried in an argon atmosphere, was dissolved in a 1:1 (vol/vol) solvent mixture of ethylene carbonate and diethyl carbonate. Then, compounds shown in Table 1 were added to each solution at concentrations shown in Table 1 (no compound was added in Comparative Examples 1 and 2). Coin-type cells were manufactured using these electrolyte solutions, the negative electrodes shown in Table 1, and the positive electrode. Table 1 shows the evaluation results.

TABLE 1

| | Negative electrode type | Compound added to electrolyte solution | | Discharge capacity at third cycle (mAh) | Discharge capacity at 30th cycle (mAh) | Capacity retention ratio (%) |
| | | Compound name | Concentration in electrolyte solution (wt %) | | | |
|---|---|---|---|---|---|---|
| Example 1 | Silicon thin film negative electrode | Dimethyl sulfoxide | 2 | 3.01 | 2.03 | 67.4 |
| Example 2 | | Dimethyl sulfoxide | 1 | 2.93 | 1.9 | 64.8 |
| Example 3 | | Tetramethylene sulfoxide | 2 | 3.03 | 1.99 | 65.7 |
| Example 4 | | Tri-n-butylphosphine oxide | 2 | 2.95 | 1.93 | 65.4 |
| Example 5 | | 1-n-butylphosphorane-1-oxide | 2 | 2.9 | 1.91 | 65.9 |
| Comparative Example 1 | | — | — | 2.84 | 1.68 | 59.2 |
| Example 6 | Tin thin film negative electrode | Dimethyl sulfoxide | 2 | 0.46 | 0.44 | 96 |
| Example 7 | | Dimethyl sulfoxide | 1 | 0.45 | 0.43 | 96 |
| Example 8 | | Tetramethylene sulfoxide | 2 | 0.46 | 0.44 | 96 |
| Example 9 | | Tri-n-butylphosphine oxide | 2 | 0.45 | 0.43 | 96 |
| Example 10 | | 1-n-butylphosphorane-1-oxide | 2 | 0.45 | 0.43 | 96 |
| Comparative Example 2 | | — | — | 0.43 | 0.41 | 95 |

Table 1 indicates that the compounds expressed by the general formula (I) according to the present invention in the electrolyte solutions improve the coulombic efficiency and the charge and discharge cycle performance.

As described in detail above, the present invention provides a nonaqueous electrolyte secondary battery having high energy density in which the decomposition of the electrolyte solution is efficiently prevented, the coulombic efficiency is high, and the charge and discharge cycle performance are excellent.

The invention claimed is:

1. A nonaqueous electrolyte solution comprising a nonaqueous solvent and a lithium salt dissolved therein;
wherein said nonaqueous electrolyte solution comprises a compound expressed by a general formula (I):

$$R_n\text{-M=O} \quad (I)$$

(wherein, R is an alkyl group optionally having a substituent, and n Rs may be identical or different from one another, may be independent substituents, or may be bound to each other to form a ring; M is S or P; and n is 2 when M is S and is 3 when M is P).

2. The nonaqueous electrolyte solution according to claim 1, wherein the compound expressed by the general formula (I) is contained in the electrolyte solution in the range of 0.01% to 10% by weight.

3. The nonaqueous electrolyte solution according to claim 1, wherein in the general formula (I), each of the n Rs is an independent chain alkyl group having 1 to 4 carbons and optionally having a substituent.

4. The nonaqueous electrolyte solution according to claim 1, wherein in the general formula (I), M is S, two Rs are bound together to form an alkylene group having 4 to 6 carbons and optionally having a substituent, and the alkylene group constitutes part of a ring.

5. The nonaqueous electrolyte solution according to claim 1, wherein in the general formula (I), M is P, two of three Rs are bound together to form an alkylene group having 4 to 6 carbons and optionally having a substituent, the alkylene group constitutes part of a ring, and the remaining R is a chain alkyl group having 1 to 4 carbons and optionally having a substituent.

6. The nonaqueous electrolyte solution according to claim 1, wherein 70% by volume or more of the nonaqueous solvent is at least one solvent selected from the group consisting of a lactone compound, a cyclic carbonate, a chain carbonate, a chain ether, and a chain carboxylate ester each having 3 to 9 total carbon atoms, and 20% by volume or more is the lactone compound and/or the cyclic carbonate.

7. The nonaqueous electrolyte solution according to claim 6, wherein in the nonaqueous solvent, the lactone compound is at least one selected from the group consisting of γ-butyrolactone, γ-valerolactone, and δ-valerolactone, the cyclic carbonate is at least one selected from the group consisting of ethylene carbonate, propylene carbonate, and butylene carbonate, and the chain carbonate is at least one selected from the group consisting of dimethyl carbonate, diethyl carbonate, and ethyl methyl carbonate.

8. The nonaqueous electrolyte solution according to claim 1, wherein the electrolyte solution contains $LiBF_4$ and/or $LiPF_6$ in the range of 5 to 100% by mole based on the total lithium salt, as a lithium salt or lithium salts.

9. A nonaqueous electrolyte secondary battery comprising:
a negative electrode comprising a collector and a thin film of active material deposited on said collector by a CVD method, sputtering, evaporation, thermal spraying, or plating, wherein said thin film of said active material can lithiate and delithiate and is divided into columns by cracks formed in a thickness direction, and a bottom of each column is adhered to said collector;
a positive electrode which can lithiate and delithiate; and
an electrolyte solution comprising a nonaqueous solvent and a lithium salt dissolved therein;
wherein said electrolyte solution is said nonaqueous electrolyte solution according to any one of claims 1 through 5 or 6 through 8.

10. The nonaqueous electrolyte secondary battery according to claim 9, wherein the collector is rough-surfaced copper foil.

11. The nonaqueous electrolyte secondary battery according to claim 9, wherein a component of the collector diffuses in the thin film of the active material.

12. The nonaqueous electrolyte secondary battery according to claim 9, wherein the positive electrode contains at least one lithium transition metal oxide selected from the group consisting of lithium cobalt oxide, lithium nickel oxide, lithium manganese oxide, and a complex oxide thereof.

* * * * *